US012717924B2

(12) United States Patent
Lee et al.

(10) Patent No.: US 12,717,924 B2
(45) Date of Patent: Aug. 25, 2026

(54) METHODS AND SYSTEMS FOR INTELLIGENT DATA SLICE MONITORING

(71) Applicant: Stripe, LLC, San Francisco, CA (US)

(72) Inventors: Hung Fuk Lee, Bothell, WA (US); Lakshmi Narayan, Berkeley, CA (US); Christopher Michael Prince, San Franciso, CA (US); David Stearns, Seattle, WA (US)

(73) Assignee: Stripe, LLC, San Francisco, CA (US)

( * ) Notice: Subject to any disclaimer, the term of this patent is extended or adjusted under 35 U.S.C. 154(b) by 302 days.

(21) Appl. No.: 18/106,340

(22) Filed: Feb. 6, 2023

(65) Prior Publication Data

US 2024/0265111 A1 Aug. 8, 2024

(51) Int. Cl.
*G06F 21/57* (2013.01)
*G06Q 20/40* (2012.01)

(52) U.S. Cl.
CPC .......... *G06F 21/577* (2013.01); *G06Q 20/40* (2013.01)

(58) Field of Classification Search
CPC ...... G06F 21/577; G06Q 20/40; G06Q 20/10; G06Q 20/4016
See application file for complete search history.

(56) References Cited

U.S. PATENT DOCUMENTS

| | | | | |
|---|---|---|---|---|
| 2019/0236177 | A1* | 8/2019 | Jain | G06F 16/2365 |
| 2020/0167786 | A1* | 5/2020 | Kursun | H04L 63/08 |
| 2020/0210260 | A1* | 7/2020 | Prabhakar | G06F 11/0751 |
| 2023/0195715 | A1* | 6/2023 | Schleith | G06F 16/285 707/691 |

OTHER PUBLICATIONS

Lee, B. S., Kaufmann, J. C., Rizzo, D. M., & Haq, I. U. (2022, November). Peak anomaly detection from environmental sensor-generated watershed time series data. In Annual International Conference on Information Management and Big Data (pp. 142-157). Springer Nature Switzerland. (Year: 2022).*

Wang et al. "Hierarchical dynamic slicing" Jul. 9, 2007 [retrieved on Dec. 18, 2025]. Retrieved from the internet: <URL: https://dl.acm.org/doi/abs/10.1145/1273463.1273494> (Year: 2007).*

* cited by examiner

*Primary Examiner* — Hany S. Gadalla
(74) *Attorney, Agent, or Firm* — Foley & Lardner LLP

(57) ABSTRACT

Disclosed herein are systems and methods for efficiently analyzing data using intelligent methods and systems. In an embodiment, a server identifies an aggregated data associated with an electronic payment system comprising data corresponding to a set of attributes for a set of transactions associated with the electronic payment system, each attribute having one or more corresponding values; generates a set of data slices from the aggregated data, the set of data slices including a first data slice containing data corresponding to a first value of a plurality of values associated with a first attribute of the set of attributes; executes a computer model that receives an input of the aggregated data and an input of at least the first data slice and outputs an identification of an anomaly associated with the electronic payment system.

20 Claims, 6 Drawing Sheets

200

Identifying an aggregated data associated with an electronic payment system comprising data corresponding to a set of attributes for a set of transactions associated with the electronic payment system, each attribute having one or more corresponding values. 210

Generating a set of data slices from the aggregated data, the set of data slices including a first data slice containing data corresponding to a first value of a plurality of values associated with a first attribute of the set of attributes. 220

Executing a computer model that receives an input of the aggregated data and an input of at least the first data slice and outputs an identification of an anomaly associated with the electronic payment system, wherein the server determines whether to add an additional data slice from the set of data slices to the first data slice. 230

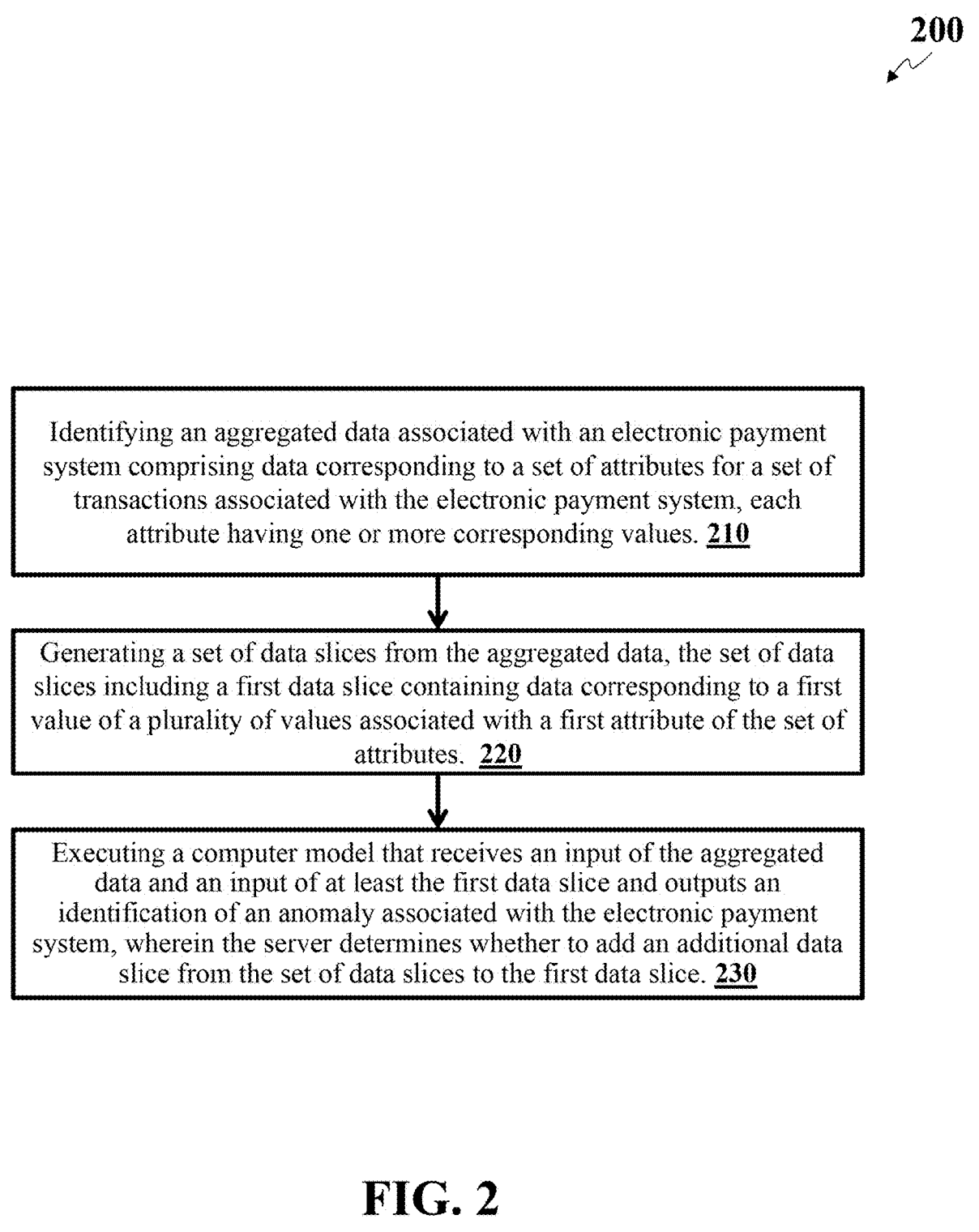

200

Identifying an aggregated data associated with an electronic payment system comprising data corresponding to a set of attributes for a set of transactions associated with the electronic payment system, each attribute having one or more corresponding values. 210

Generating a set of data slices from the aggregated data, the set of data slices including a first data slice containing data corresponding to a first value of a plurality of values associated with a first attribute of the set of attributes. 220

Executing a computer model that receives an input of the aggregated data and an input of at least the first data slice and outputs an identification of an anomaly associated with the electronic payment system, wherein the server determines whether to add an additional data slice from the set of data slices to the first data slice. 230

FIG. 2

METHODS AND SYSTEMS FOR INTELLIGENT DATA SLICE MONITORING

TECHNICAL FIELD

This application relates generally to monitoring and segmenting data to efficiently analyze large volumes of data and towards training and operating computer models to efficiently segment and analyze detect problems in computer systems.

BACKGROUND

A resilient and reliable electronic payment system may require pathways to identify anomalous behavior and system failures. Most electronic payment systems rely on code paths, merchant/user inputs, card networks, issuing banks, and other processing infrastructure providers to facilitate transactions. System errors originating from these different components can cause authorization rate drops in certain subsets of transactions. When a component is experiencing an incident (e.g., declining transactions erroneously), the authorization rate drops, and users are unable to collect revenue for a portion of their business, which is highly undesirable. Therefore, identifying that a component has been misconfigured or has been experiencing technical difficulties is important.

To identify anomalous declines (that could eventually lead to system failures or other technical issues), electronic payment systems monitor transaction data and analyze the monitored data to identify anomalous behavior. However, as electronic payment systems grow and build new features, the amount of data generated increases exponentially where the data is typically high-dimensional and noisy. Monitoring and analyzing data at a high level (aggregated data produced by the electronic payment system) may not readily identify anomalous behavior because the anomalous behavior may be indicated in a subset of transactions that corresponds to a small portion of the data. Therefore, analyzing metrics at a high level may not lead to the efficient identification of anomalies. Moreover, segmenting the data into too many segments leads to sparsity of the data amongst the segments, and analyzing data at a granular level may require additional processing of the segments, which may lead to detection delays, which is also undesirable, especially for electronic payment systems where fast detection of problems may be crucial.

SUMMARY

For the aforementioned reasons, there is a desire for methods and systems to provide a rapid and efficient analysis of pertinent segments of data that can be analyzed to identify anomalous behavior associated with an electronic payment system. As used herein, anomalous behavior may refer to anomalous authorization declines, such as having an unexpected number of declines vs approvals within a given slice of data (e.g., indicating a series of charges). What is also desired is methods and systems to train computer models to identify data slices (a particular segment of transactions and their underlying data segmented based on a particular attribute(s)) that would indicate an anomaly without requiring high computing power and in a timely manner.

While some conventional systems are designed and configured to detect and alert on traditional reliability errors (e.g., traditional system reliability problems, such as communication errors, hardware faults, or unexpected software exceptions), the systems and methods discussed herein can intelligently identify anomalous declines using intelligently segmented data. Identifying anomalous declines has proven to be more complicated and technically challenging because these anomalous behaviors may sometimes appear legitimate due to the fact that some declines are due to appropriate and legitimate reasons. Non-limiting examples of legitimate reasons for an issuer to decline a particular charge may include stolen card, over-limit cards, closed accounts, and the like. Identifying a single decline (or a small segment of the data that indicates a small sample set of declines) may not lead to an accurate/efficient determination of whether the decline is appropriate or not (for the entire system). However, using the methods and systems discussed herein, anomalies can be detected in the aggregate authorization rate (ratio of approvals to declines) within a slice of charge traffic over a time period. That is, a server can detect when an electronic payment system is receiving more declines than the system would generally expect from that data segment over that time period.

Using the methods and systems disused herein, a server can segment the data intelligently, such that analyzing the intelligently segmented data leads to identification of a meaningful shift in the underlying probability of authorization in any code path.

Disclosed herein are methods and systems associated with a slice monitoring system that uses various methods, such as algorithmic methods and machine-learning models, to identify an appropriate data slice that would indicate anomalous behavior. The disclosed slice monitoring system may allow for notifications to be sent to system administrators when an anomaly is detected. The disclosed slice monitoring system can train a machine learning model, such that the machine learning model can intelligently cluster and disaggregate the data into appropriate data slices. Appropriate data slices may include enough information to illustrate anomalous behavior and may allow (because they include a subset of the data and thereby require less computing power to analyze) for real-time or near real-time analysis. Fast and efficient analysis of data is highly desired in payment systems because anomalous behavior can be quickly identified and rectified. The disclosed slice monitoring system provides a scalable way of disaggregating the data into data slices and monitoring them to identify anomalies.

In an embodiment, a method comprises identifying, by a server, aggregated data comprising data corresponding to a set of attributes for a set of transactions, each attribute having one or more corresponding values; generating, by the server, a set of data slices from the aggregated data, the set of data slices including a first data slice containing data corresponding to a first value of a plurality of values associated with a first attribute of the set of attributes; and executing, by the server, a computer model that receives an input of the aggregated data and an input of at least the first data slice and outputs an identification of an anomaly associated with the aggregated data, wherein the server determines whether to add an additional data slice from the set of data slices to the first data slice.

In another embodiment, a system comprises a non-transitory storage medium comprising a set of instructions that when executed, cause a processor to: identify aggregated data comprising data corresponding to a set of attributes for a set of transactions, each attribute having one or more corresponding values; generate a set of data slices from the aggregated data, the set of data slices including a first data slice containing data corresponding to a first value of a plurality of values associated with a first attribute of the set of attributes; and execute a computer model that receives an input of the aggregated data and an input of at least the first data slice and outputs an identification of an anomaly associated with the aggregated data, wherein the processor determines whether to add an additional data slice from the set of data slices to the first data slice.

In another embodiment, a system comprise a processor configured to identify aggregated data comprising data corresponding to a set of attributes for a set of transactions, each attribute having one or more corresponding values; generate a set of data slices from the aggregated data, the set of data slices including a first data slice containing data corresponding to a first value of a plurality of values associated with a first attribute of the set of attributes; and execute a computer model that receives an input of the aggregated data and an input of at least the first data slice and outputs an identification of an anomaly associated with the aggregated data, wherein the processor determines whether to add an additional data slice from the set of data slices to the first data slice.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 2 illustrates a flow diagram of a process executed in an intelligent slice monitoring system, according to an embodiment.

DETAILED DESCRIPTION

Figure 1:
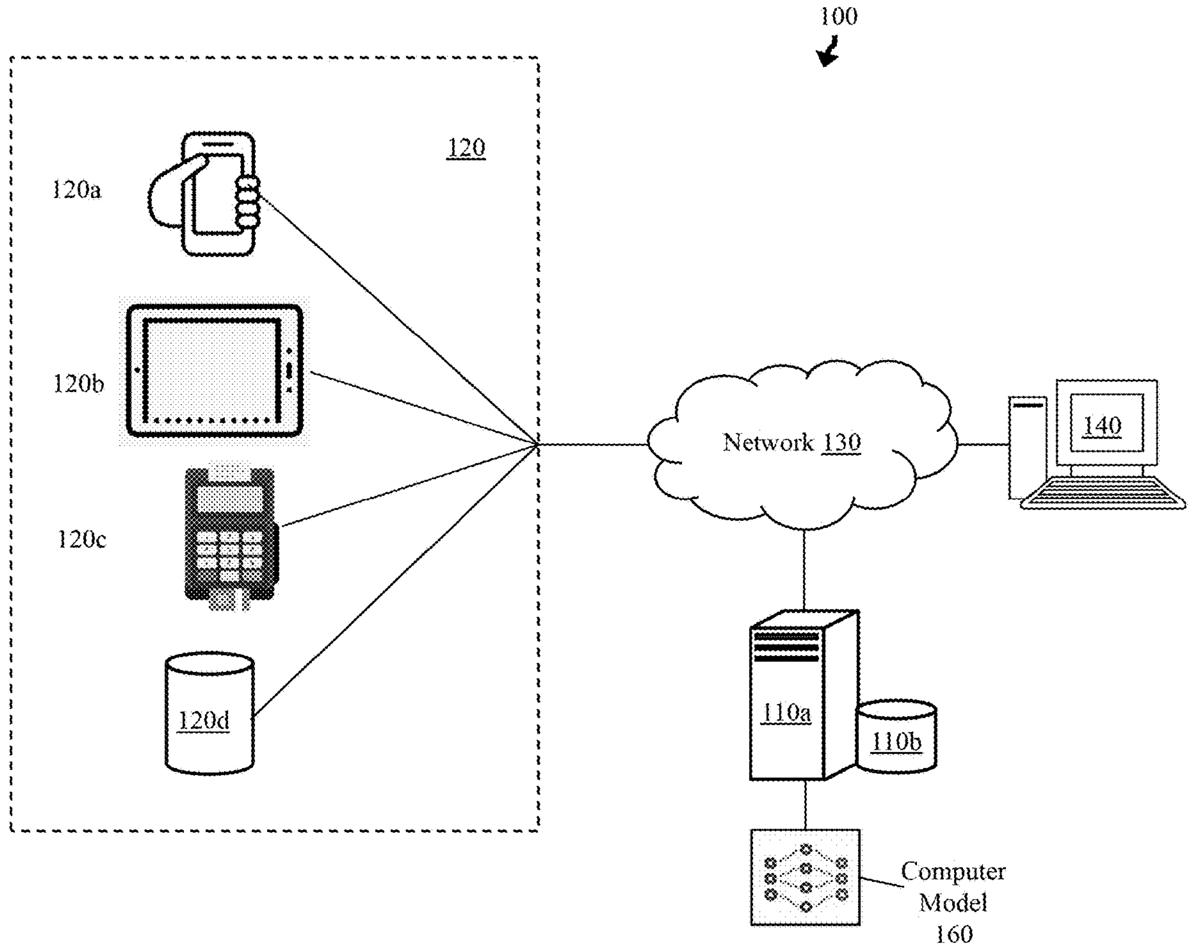
FIG. 1 illustrates various components of an intelligent slice monitoring system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

As will be described below, a server (referred to herein as the analytics server) can identify data slices and train/execute computer models to efficiently analyze data associated with an electronic payment system.

FIG. 1 is a non-limiting example of components of an intelligent data slice monitoring system 100 in which an analytics server 110*a* operates. The analytics server 110*a* may utilize features described in FIG. 1 to retrieve and analyze data and generate/display results. However, the system 100 is not confined to the components described herein and may include additional or other components not shown for brevity, which are to be considered within the scope of the embodiments described herein.

The analytics server 110*a* may be communicatively coupled to a system database 110*b*, an electronic payment system 120 (including electronic devices 120*a*-120*d*), and an administrator computing device 140. The analytics server 110*a* may also use various computer models (e.g., computer model 160) to analyze the data retrieved from the electronic payment system 120.

The above-mentioned components may be connected through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110*a* may generate and display an electronic platform configured to output the results of analyzing data retrieved. The electronic platform may include one or more graphical user interfaces (GUIs) displayed on the administrator computing device 140. An example of the platform generated and hosted by the analytics server 110*a* may be a web-based application or a website configured to be displayed on various electronic devices, such as mobile devices, tablets, personal computers, and the like. In a non-limiting example, the platform may be used to identify possible fraudulent activity and/or system failures associated with the electronic payment system 120. For instance, the platform may indicate that one or more elements of transaction processing might be having technical issues. The platform may also indicate one or more attributes associated with the technical issue, e.g., the transaction server in Mexico is down.

The analytics server 110*a* may be any computing device comprising a processor and non-transitory, machine-readable storage capable of executing the various tasks and processes described herein. The analytics server 110*a* may employ various processors such as a central processing unit (CPU) and graphics processing unit (GPU), among others. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The electronic payment system 120 may represent various electronic components that receive, retrieve, and/or access data needed to perform one or more transactions and facilitate payments. Therefore, the electronic payment system 120 may include various hardware and software components.

For instance, the electronic payment system 120 may include an end-user device 120*a* executing a payment application (hosted by a payment server 120*d*). An end-user (e.g., merchant) may use the payment application to send/receive payments to other users or other recipients inside/outside a payment network. In another example, a merchant device 120*b* may execute the payment application (hosted by the payment server 120*d*) to facilitate transactions and to generate transaction documents and receipts. In another example, a merchant may use a point-of-sale system 120*c* to facilitate one or more transactions (e.g., card-present transactions). In a non-limiting example, the electronic payment system 120 may represent a payment application hosted by one or more servers (e.g., payment server 120*d*) that facilitates electronic payments between different devices.

In some embodiments, the data received from different components of the electronic payment system 120 may be aggregated (e.g., by the payment server 120*d*) and may be transmitted to the analytics server 110*a* to be analyzed. The analytics server 110*a* may then apply various analytical protocols discussed herein to analyze the data and present the results for a system administrator operating the administrator computing device 140.

The administrator computing device 140 may represent a computing device operated by a system administrator. The administrator computing device 140 may be configured to display attributes generated by the analytics server 110*a* (e.g., various analytic metrics determined as a result of analyzing the data received from the electronic payment system 120 or data generated during training/execution of the computer model 160); monitor the computer model 160 utilized by the analytics server 110*a*, review feedback; and/or facilitate training or retraining (calibration) of the computer model 160 that are maintained by the analytics server 110*a*.

In a non-limiting example, an administrator may access the platform hosted by the analytics server 110*a* to access alerts generated by the analytics server 110*a*. The alerts may identify one or more anomalous behavior associated with the electronic payment system 120. The administrator may review the alerts and indicate whether they are true positive alerts or false positive alerts. The analytics server 110*a* may monitor the administrator's activity and interactions with the alerts. If the analytics server 110*a* determines that the administrator has indicated a false positive, the analytics server 110*a* may re-calibrate the computer model 160 accordingly. Thereby, the analytics server 110*a* may generate a feedback loop where the data is periodically used to improve the system and retrain the computer model 160.

The computer model 160 may be trained using data received or retrieved from the analytics server 110*a* and/or the electronic payment system 120. The analytics server 110*a* may execute the computer model 160 to analyze the data and/or identify attributes needed to verify the data (e.g., thresholds needed to analyze the data). Additionally, the analytics server 110*a* may train the computer model 160 using a training dataset generated based on monitoring data associated with the electronic payment system 120. As depicted, the analytics server 110*a* may store the computer model 160 (e.g., neural networks, random forest, support vector machines, regression models, recurrent models, etc.) in an accessible data repository, such as the system database 110*b*.

FIG. 2 illustrates a flow diagram of a process executed in an intelligent data slice monitoring system, according to an embodiment. The method 200 includes steps 210-230. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. Using the methods and systems described herein, such as the method 200, the analytics server may intelligently segregate data and generate dynamic data slices, such that the results can indicate an anomaly in an electronic payment system in an efficient and timely manner.

At step 210, the analytics server may monitor aggregated data records associated with an electronic payment system comprising data corresponding to a set of attributes for a set of transactions associated with the electronic payment system, each attribute having a corresponding value. In some embodiments, the analytics server may use one or more APIs to retrieve data from one or more data sources associated with the electronic payment system. For instance, the analytics server may be in communication with one or more POS systems and/or third-party servers facilitating transactions for the electronic payment system, such as servers associated with one or more clearing houses, banks, third-party vendors, and the like. In another embodiment, the analytics server may be in communication with one or more servers hosting a payment application that facilitate transactions between users (e.g., merchants and customers or peer-to-peer payments).

The data received may be an aggregated collection of data associated with the electronic payment system. Therefore, the aggregated data may correspond to a set of transactions conducted using the electronic payment system. The data may include a set of attributes associated with the set of transactions where each attribute also includes (or corresponds to) a value. An attribute, as used herein, may refer to any characteristic of the transaction that is collected by one or more components of the electronic payment system.

The attribute may have a corresponding value where different values may belong to different categories, such as numeric, binary, and the like. For instance, an attribute of "card-present" may include a binary value of 0 or 1 indicating whether a card was present during a transaction. In contrast, an attribute of "time" may include four digits indicating a timestamp of the transaction (e.g., 10:39 or 1039). In another example, an attribute of "fiat" may have a corresponding value of "yen," "US Dollar," or "Pesos." In another example, an attribute may be an "issuing bank" and the value may be the name of the issuing bank itself. In another example, the attribute may correspond to an attribute of electronic communication associated with the transaction. For instance, a binary attribute may correspond to whether a transaction server (e.g., a server of the electronic payment system) transmitted a CVC number (or other information needed to process the payment) to a payment processing server.

At step 220, the analytics server may generate a set of data slices from the aggregated data, the set of data slices including a first data slice containing data corresponding to a first value of a plurality of values associated with a first attribute of the set of attributes. The analytics server may use various data segmentation and disaggregation methods to segment (cluster) the data into different data slices. As used herein, a data slice, may refer to one or more data records from the set of data records (that correspond to one or more transactions) included in the monitored aggregated data received/retrieved at step 210. Therefore, a data slice may refer to a representation of a portion of the data (e.g., a group of transactions) that is segmented based on an attribute and/or a value of the attribute. That is, the data slice may include data records corresponding to one or more transactions grouped in accordance with their attributes.

Non-limiting examples of attributes may include card brand, issuing bank, card-present in transaction or not present, whether CVC was passed with the card, and the like. The analytics server may use one or more of the attributes to disaggregate the data into distinct data slices.

In a non-limiting example, a data slice may include data associated with all transactions that were conducted in Mexico (geographic attribute). The same data slices can be further disaggregated and narrowed by another attribute, such as transactions conducted in Mexico on a specific date (time attribute). The data slice can also be segmented based on a specific value or a range of values. For instance, a data slice may correspond to transactions conducted in Mexico during 1-3 PM on a specific date. As a result, data slices can be designed to be segmented to have as few or as many data records as needed to evaluate the data.

In some embodiments, the analytics server may have a pre-determined list of attributes and may automatically generate a group of data slices. The data slices may be arranged in a hierarchical manner. For instance, an electronic payment system's aggregated data may be disaggregated, at a first level, by continent; as a second level of hierarchy by country; at a third level of hierarchy by other attributes (e.g., card-present, card not present, time, issuing bank, and the like). Thereby, the analytics server may generate a decision tree having different branches and leaf nodes where different nodes correspond to different data slices. As described herein, the analytics server may traverse this hierarchy of data slices and iteratively analyze different combinations of data slices until an appropriate grouping of data slices that can indicate an anomaly is identified.

In some embodiments, the disaggregation may be conducted based on a defined logic. For instance, the data can be sliced based on characteristics that invoke certain logic. In a non-limiting example, one data slice may correspond to different a specific acquirer, whether there is a payment intent, whether a payment is a subscription, card brand, whether the card is a store card or a bank card, and the like.

At step 230, the analytics server may execute a computer model that receives an input of the aggregated data and an input of at least the first data slice and outputs an identification of an anomaly associated with the electronic payment system, wherein the server determines whether to add an additional data slice from the set of data slices to the first data slice.

The analytics server may execute a computer model that determines an optimum/appropriate number of data slices (grouped together) needed to identify an anomaly and generate a meaningful alert. The computer model may be any collection of algorithmic approaches that analyzes different data slices and indicates whether that data slice indicates an anomaly (associated with the electronic payment system) within the aggregated data. In some embodiments, the computer model may be an artificial intelligence model that can use various machine learning models and protocols to receive an input of the aggregated data and outputs an identification of an anomaly associated with the electronic payment system.

The computer model may analyze different data slices to identify a number of data slices that would indicate an anomaly. To analyze different data slices, the computer model may compare a value of an attribute within a data slice against a predetermined threshold or baseline. For instance, the computer model may identify one or more predetermined thresholds (corresponding to an attribute) to identify whether an anomaly can be identified.

The computer model may use the hierarchy of data slices indicating a systematic method of approaching how to segment the data into data slices and how to analyze the data to achieve meaningful results. For instance, the computer model may initiate its analysis using smaller (or sometimes the smallest) data slices. The computer model may analyze the data slice and determine whether the data slice indicates an anomaly. If so, the computer model may iteratively aggregate the analyzed data slice with another data slice (e.g., a neighboring data slice within the hierarchy). The computer model may then analyze the aggregated combination of two data slices and determine whether the anomaly is also detected. The computer model may iteratively repeat the process until and unless the anomaly is no longer detectable. That is, the computer model may traverse the hierarchy of data slices (laterally and/or vertically) until an ideal combination of data slices indicate the anomaly. While traversing the hierarchy, the computer model may also train itself (via machine learning methodologies) to learn patterns of identification for the appropriate and ideal grouping of data slices.

Each data slice may have different behaviors and its analysis may depend on the attributes that correspond to that data slice. The computer model may use a machine-learning protocol to predict the likelihood of a success rate associated with a data slice (e.g., whether the transactions in a data slice have a success rate that indicates an anomaly. The likelihood may be numerically represented as a percentage likelihood of success (50% likelihood that a transaction in a data slice is successful) or a scale of [0-1]. Using this method, the computer model may normalize how success is defined between different data slices that represent different attributes of transactions. The success rate (or likelihood) may be directly related to whether an anomaly exists. For instance, if a number of charges or transactions within a data slice that is predicted to be unsuccessful satisfy a threshold, then the computer model may determine that an anomaly or a system failure may exist.

Generally, when an electronic payment system is operating normally, whether a charge is authorized or declined is driven by one or more stochastic processes of users making payments with an unobserved success rate. This rate is sometimes referred to as the authorization rate or "auth rate." When an anomalous behavior exists, the authorization rate for one or more data slices may be affected (e.g., the authorization rate may drop).

Rather than analyzing raw authorization data using the machine learning detection protocol, the computer model may use the probability of decline from the card testing decline model to adjust the target variable. For instance, the computer model may use the following formula:

$$y_i = A_i - E[A_i] \text{ for each charge } i$$

Where is the actual $A_i \in \{1=\text{Authorized}, 0=\text{Declined}\}$ is the actual gateway outcome and $[A_i]=(1-[Di]) \in [0, 1]$ is the prediction from the decline model. Thus the range of $y_i$ is between [−1-1] with the following behavior:

Case A: When a charge/transaction is predicted to decline and gets declined, then $y_i$ is around 0.

Case B: When a charge/transaction is predicted to authorize and gets authorized, then $y_i$ is around 0.

Case C: When a charge/transaction is predicted to decline but is authorized, then $y_i$ is closer to 1.

Case D: When a charge/transaction is predicted to authorize but is declined, then $y_i$ is closer to −1.

Cases A and B may indicate normal operations. Case D may arise more often during a complete or partial outage or indicate an anomaly. Thus, the computer model may detect when $y_i$ has shifted from zero into the negative direction. Therefore, the detection of authorization rate may refer to the detection of changes in the average value of $y_i$.

Figure 3:
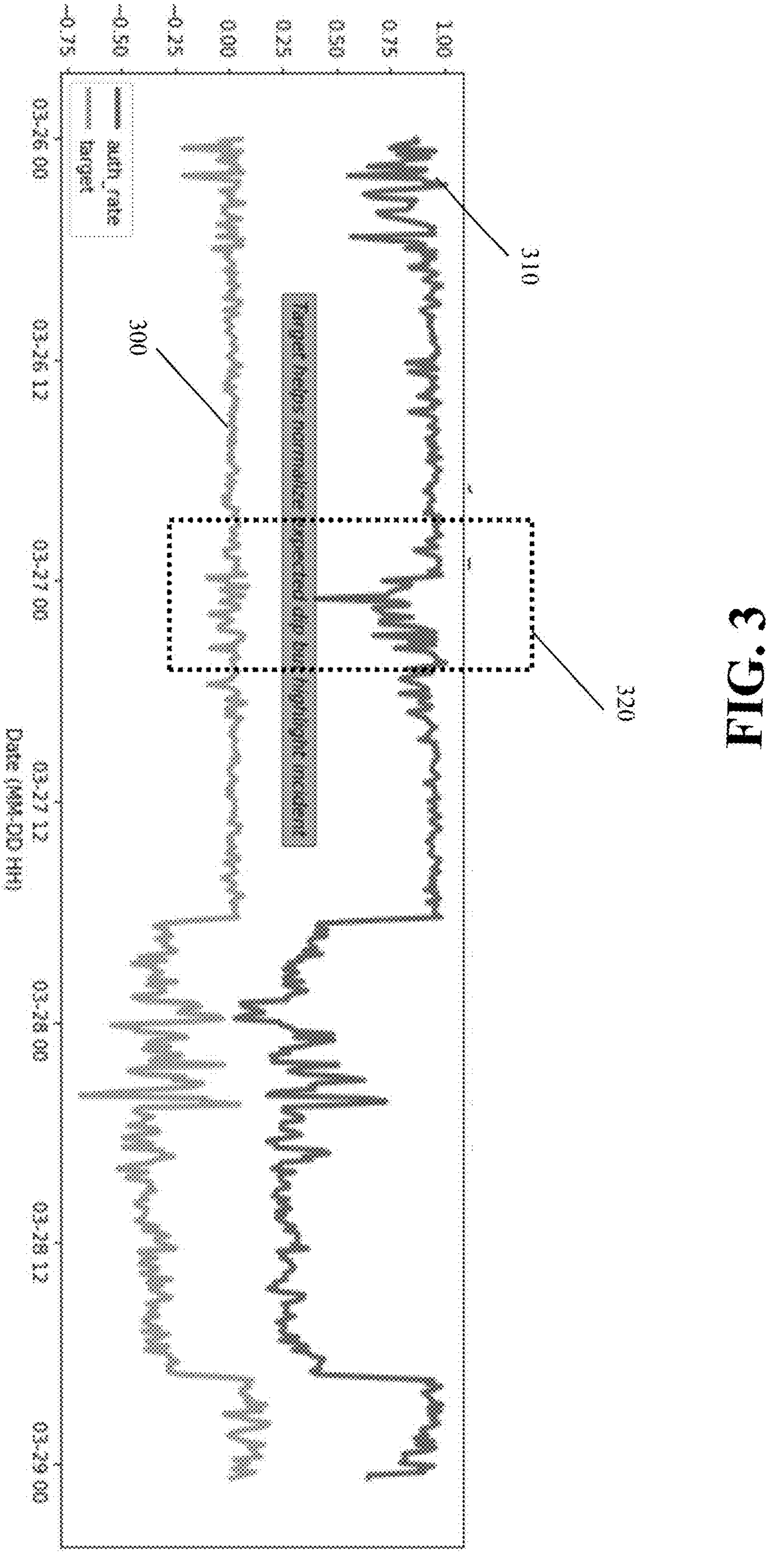
FIG. 3 illustrates a process executed in an intelligent slice monitoring system, according to an embodiment.

In some embodiments, target authorization rates may be used to normalize certain data points. In this way, the analytics server may reduce noisy data. For instance, as depicted in FIG. 3, target authorization rates (line 300) can be used to normalize expected "dips" 320 in the actual authorization rate (line 310).

Referring back to FIG. 2, the computer model may identify points where generative parameters change. An abrupt change in these parameters is sometimes referred to as a "change point." The computer model may model and infer these events using machine learning protocols. Often time, the data received corresponds to a sequence of data (time series of some aggregated metrics). Aggregating low-sample data slices may be crude and variable, leading to unstable inference. Therefore, in some embodiments, the computer model may utilize a Bayesian Online Change Point Detection (BOCPD) methodology. In some embodiments, a change point is an indicator of a possible anomaly. For instance, a change point may indicate that authorization rate has dropped significantly. Therefore, that particular data slice may indicate a possible anomaly (when the authorization rate is below a particular threshold/baseline). As a result, the computer model may generate an alert associated with the anomaly.

The computer model may also use a sequential alert logic and loss estimator. When the computer model identifies an active alert (e.g., from the previous hour), the computer model may assess whether the authorization rate degradation is ongoing and report the cumulative lost volume since the start of the alert. To do this, at the start of each iteration, this computer model may consume BOCPD output from the current hour and hourly slice output from the previous hour (or any other time frame). Regardless of whether there was an alert from the previous hour, each data slice may have been evaluated via the BOCD algorithm to detect changes in the authorization rate.

Figure 4:
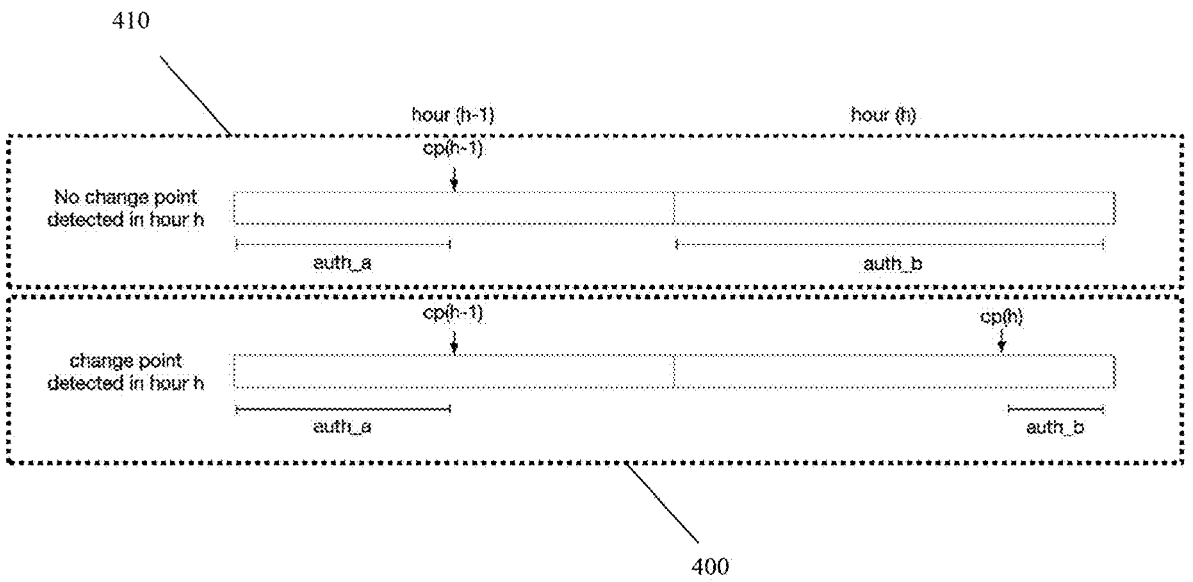
FIG. 4 illustrates a process executed in an intelligent slice monitoring system, according to an embodiment.

As depicted in FIG. 4, if there is an active slice alert from the previous hour and a change point is detected in the current hour, the computer model may compare the authorization rate after the latest change point to the authorization rate before the start of the alert to determine whether the authorization rate has recovered, as depicted in example 400. If there is an active data slice alert from the previous hour and a change point is not detected (example 410) the computer model may compare the authorization rate for the most recent hour to the authorization rate before the start of the alert to determine whether the authorization rate has recovered.

If the comparison shows that the authorization rate has recovered, the computer model may reset the estimated lost volume for the slice to zero. If the authorization rate is still degraded, the computer model may add the estimated lost volume from the most recent hour and add it to the total from the previous hour.

Starting when the authorization rate drop is detected, the computer model may estimate lost volume by summing the authorization presentment amount of transactions that had a probability of decline (e.g., less than 0.5) but were not authorized. To avoid bias from inaccurate decline model predictions, the computer model may subtract the authorization presentment amount from charges that had a probability of decline (e.g., more than 0.5) but were authorized.

Using the methods discussed herein, the computer model identifies success rate (and ultimately one or more anomalies), with a robust and scalable approach where data can be systematically and efficiently analyzed. The computer model may then compare the analyzed data (corresponding to a data slice) with a threshold or baseline value to determine whether the data slice's behavior indicates normal operation status or an anomaly.

In some embodiments, the computer model may use a pre-determined threshold. For instance, if an authorization rate of a data slice is below 80%, the computer model may assume that an anomaly exists. However, in some other embodiments, the computer model may determine the threshold, which may correspond to a dynamic (not pre-determined) value that can indicate what is considered normal and what is considered anomalous behavior.

The threshold to evaluate the data may depend on the data slice itself (attributes used to disaggregate the data). For instance, a small data slice indicating a very thin segment of the data may require a higher threshold than a larger data slice having a different (sometimes higher) volume of transactions and transaction attributes. In an illustrative example, a data slice comprising data associated with card-present transactions in New Mexico may require a different threshold than a second data slice comprising data associated with card-present and card-not-present transactions in New York City.

Moreover, not all unsuccessful behavior may indicate an anomaly within a data slice. For instance, an unsuccessful transaction may be caused by a user error (e.g., incorrect input of data) or may be caused by insufficient funds. Therefore, even if a transaction is denied or unsuccessful, the electronic payment system may not have any technical issues. Thus, a 90% success rate for certain data slices may indicate normal behavior of the electronic payment system. Furthermore, the threshold may also depend on various other attributes, such as the time of transaction, the region of the transaction, and the like. For instance, a data slice corresponding to transactions in location A may need to be evaluated against a different threshold than a second data slice corresponding to transactions in location B.

The threshold may be a dynamic threshold that can be revised in accordance with the latest trends and data variations. Initially, the threshold may be calculated using historical baselines. For instance, a review of data slices for an issuing Bank A may indicate that this issuing bank has a historical baseline of 80%. In another example, reviewing historical data may also indicate that transactions from Location A may have an 80% success rate but similar transactions from location B may have a 90% success rate. Initially, the computer model may use these values to evaluate whether a data slice (e.g., corresponding to Location A or B) exhibits anomalous behavior.

In some configurations, a threshold or baseline value for aggregated data slices may be different from each of the data slices when considered individually. For instance, transactions in Mexico may have a threshold/baseline of 85% success rate. However, when aggregated with transactions in the United States, the new data slice for North America may have a different baseline/threshold of charge success rate.

In some embodiments, the analytics server may train a separate model to predict baseline values associated with different data slices, such that the threshold used to assess the data slice is no longer a static threshold. As a result, as data slices evolve (the type of transactions in that data slice change), the machine learning model may revise/adjust the threshold by increasing or decreasing the threshold. This allows for threshold adjustments that account for sudden drops and/or increases in attributes, such as flash sales or changes that can be attributed to seasonality. For instance, a data slice may need to be evaluated against an 85% authorization rate. However, during the last two weeks of December, the same data slice may be experiencing a lower success rate due to more failed transactions that are not related to anomalies in the electronic payment system. As a result, the threshold may be dynamically lowered to avoid a false positive reading.

In another example, certain subscription service providers may attempt to charge a credit card on a particular date (e.g., the first day of the month). If a transaction fails (e.g., because of insufficient funds), the subscription service will attempt to charge the same credit card at a later time (e.g., the next day). However, the second transaction may also fail due to the same reason. Therefore, many unsuccessful transactions may appear for two consecutive days (e.g., first two days of the month) where the transaction should not be attributed to an anomaly. Therefore, the threshold may be dynamically adjusted depending on when a data slice is being evaluated.

In calculating and/or revising the threshold, the analytics server may also retrieve extraneous data associated with the transactions conducted (whether successful or not). For instance, the electronic payment system may include one or more machine learning models (decline models) that analyze a transaction and predict a likelihood of transaction success for the transaction. The electronic payment system may also utilize computer models (whether machine learning or not) that predict a likelihood of fraud (fraud models). When determining the threshold, the analytics server may also consider data generated by those models. For instance, if a transaction is indicated as highly likely to be fraudulent or highly likely to be unsuccessful due to insufficient funds, the fact that the transaction is unsuccessful may not be attributed to an anomaly. Using this method, the analytics server can increase its accuracy when determining whether the authorization rate is truly due to an anomaly within the electronic payment system or due to other reasons (e.g., insufficient funds).

In some embodiments, the analytics server may aggregate data within a data slice in accordance with their respective likelihood of success received from an external model. The analytics sever model may then analyze the transactions to see if the authorization rate for those transactions correspond to what was predicted by the external models. Moreover, change point analysis can be performed, such that a change point (even for transactions that were risky or predicted to be unsuccessful) is identified. In some embodiments, a change point detected may indicate an anomaly even if the transactions were predicted to be unsuccessful.

After analyzing the data slices, the computer model may aggregate different data slices until an appropriate size/data slice has been identified. For instance, if the data slice is too thin, it may result in an increase in notifications indicating an anomaly. In contrast, if the data slice is too large, it may not indicate an anomaly. Therefore, the computer model may iteratively increase the size of the data slices until the desired size is identified. The computer model may aggregate a data slice with another data slice and iteratively analyze the aggregated data slice. The computer model may iteratively repeat this process until an appropriate data slice (that includes a group of smaller data slices) is identified. For instance, the computer model may continue aggregating data slices until the aggregated data has become large enough that anomalous behavior is diluted and not detectable anymore. In this way, the computer model may balance the size of the data slices, such that unnecessary notifications and analysis of too many data slices can be avoided while the data slices are not too voluminous that they no longer illustrate meaningful anomalies.

The computer model may apply one or more sets of rules when choosing a next data slice to aggregate with a previous data slice. For instance, in one embodiment, an initial data slice may include transaction data that correspond to the same attribute but different values. For instance, a first data slice may include transactions from Walnut Creek, California (attribute of geography and value of Walnut Creek). Analyzing this data slice may indicate that anomalous behavior exists. However, this data slice may be too thin. As a result, the computer model may aggregate the first data slice with a second data slice that corresponds to transactions from Oakland, California (attribute geography, value of Oakland). Therefore, the two data slices share a common attribute (geography) even though they have different values (Walnut Creek and Oakland).

In another example, a subsequent data slice may correspond to a new attribute. For instance, in one embodiment, a first data slice may include card-present transactions from Walnut Creek, California. Analyzing this data slice may indicate that anomalous behavior exists. However, this data slice may be too thin. As a result, the computer model may aggregate the first data slice with a second data slice that corresponds to card-present transactions from Walnut Creek from issuing Bank A.

In another example, if a data slice does not include a statistically significant number of transactions, the computer model may increase the time window, such that it includes a higher number of transactions. This may be done instead of aggregating the data slice with a secondary data slice. However, this may also be done in conjunction with aggregating the data slice with a secondary data slice. Therefore, the computer model may use a dynamic time frame.

In yet another example, the analytics server may slice the data in accordance with their intended service. For instance, a data slice may include all transactions that correspond to a particular ride-sharing application and identifies an anomaly. The computer model may then aggregate the data slice with various neighboring data slices. However, at each iteration, the computer model determines that the anomaly is no longer present. As a result, the computer model traversed back towards the original data slice. Therefore, the analytics server imputes that there is an anomaly that is limited to that particular ride-sharing application.

In some embodiments, aggregating data slices may be based on different merchants associated with each of the data slices. For instance, if a data slice corresponding to transactions associated with a ride-sharing application in New York City identifies an anomaly, the computer model may aggregate that data slice with another data slice in another location (e.g., data slice for transactions associated with the same ride-sharing application but in San Francisco) to determine whether the aggregated data slice still indicates an anomaly. If so, the computer model may determine that the anomaly is limited to the ride-sharing application.

In some embodiments, the aggregation of different data slices may be conducted in parallel. For instance, when a data slice indicates an anomaly, the computer model may identify three neighboring data slices (within the decision tree) and may create three parallel pathways where in each pathway, the data slice is aggregated with one of the three neighboring data slices. In this way, efficiencies can be created.

The computer model may evaluate historical data when combining different data slices. For instance, the computer model (after iteratively analyzing the data for a period of time) may determine that combining data slices from New York City and New Jersey have provided positive results in the past. Therefore, the computer model may train itself and use the previously combined data slices to determine how to aggregate the slices.

As slices are defined by many different transaction attributes, when an authorization breakage occurs, authorization rate drops may appear in a number of slices that share a common attribute. For example, an authorization rate drop could affect multiple slices that share an issuing bank, or a specific type of transaction (e.g., network tokenized charges without CVC). The computer model may group different data slices where a change point is detected across shared dimensions (attributes), to make the output of the overall data more easily interpretable. This may be done using decision trees to identify groups of slices that are triggering alerts. The computer model may traverse the decision tree (upward or laterally) and aggregate more data slices. After aggregating the data slices, the computer model may re-evaluate the aggregated data slices to determine whether the anomaly can still be detected. If the anomaly can be detected, the computer model may further aggregate the data slice with an additional data slice and iteratively analyze the data again. If the anomaly cannot be detected (the authorization rate is dropped below the threshold), the analytics server may traverse back and no longer aggregate the data slices.

After the sequential alert logic is executed, the computer model may generate a dataset with one row per data slice, and an indicator variable for whether that data slice has an active alert. Using the methods and systems discussed herein, the computer model may identify a next data slice to be aggregated (e.g., a neighboring data slice). As a result, the computer model may iteratively generate various combined data slices until an optimum grouping is identified. The computer model may also train itself (using machine learning techniques), such that the computer model can predict an appropriate data slice instead of traversing the decision tree/hierarchy of the data slices each time.

The analytics server may train a model using a machine learning algorithm (a decision tree) to create groups of slices that have a high probability of active alerts, and then traverse up the decision tree logic to report the dimensions that identify groups of data slices with a high probability of an active alert.

After identifying anomalies, the analytics server may generate an alert and transmit the alert to one or more computing devices. For instance, the analytics server may transmit an alert that includes an indication of the anomaly to a system administrator. The system administrator may then review the alert and take an action. If the system administrator identified the alert to be false positive, the analytics server may use this feedback to re-calibrate the computer models and algorithms discussed herein.

In some embodiments, the analytics server may combine two or more alerts to create more meaningful alerts. For instance, if two alerts are generated where the alerts indicate an anomaly in Belize and Honduras, the analytics server may combine those two alerts together into one alert that indicates an anomaly in Central America. The aggregation of alerts may be performed for different attributes and variables and may use a similar logic as aggregating data slices.

The analytics server may also apply a set of rules to identify one or more remedial actions. Based on the anomaly, the analytics server may perform a look-up table to identify an appropriate action to be taken to rectify the anomaly. The look-up table may include historical data corresponding to remedial actions taken in the past. Using the historical data, the analytics server may identify one or more actions to be taken. For instance, the analytics server may isolate one or more attributes in common among the data slices indicating an anomaly and execute one or more protocols to identify the issue (e.g., latency check). The analytics server may also flag the data slice (and its corresponding attributes) for post-alert review. For instance, the analytics server may determine that a particular ride-sharing application is common among many data slices. As a results, the analytics server may flag that ride-sharing application for a system administrator.

In a non-limiting example, the aggregated data may be disaggregated into four data slices (Mexican transactions for large entities, Mexican transactions for small entities, Mexican transactions for card-not-present, and Mexican transactions for card-present). The analytics server may determine that each of these data slices indicate an anomaly. As a result, four separate notifications may be generated. However, if the data within these slices are combined, a single notification will be generated which can indicate that transactions in Mexico are experiencing a technical issue.

Using the methods and systems discussed herein, the results of analyzing the data slices can be used to revise other models, such as fraud models. In a non-limiting example, a fraud model configured to analyze the data may be revised if the analytics server detects one or more anomalies in the system (e.g., the transaction was not rejected because of fraud but because the electronic payment system has a technical anomaly).

The methods discussed herein can be implemented periodically (or in real-time), such that the analytics server can divagate the data (as the data is received), analyze the data, and generate alerts that are in near real-time. In some implementations, once the computer model is properly trained, it may not need to iterate through as many data slices because it can predict (using machine learning) an appropriate data slice.

Figure 5:
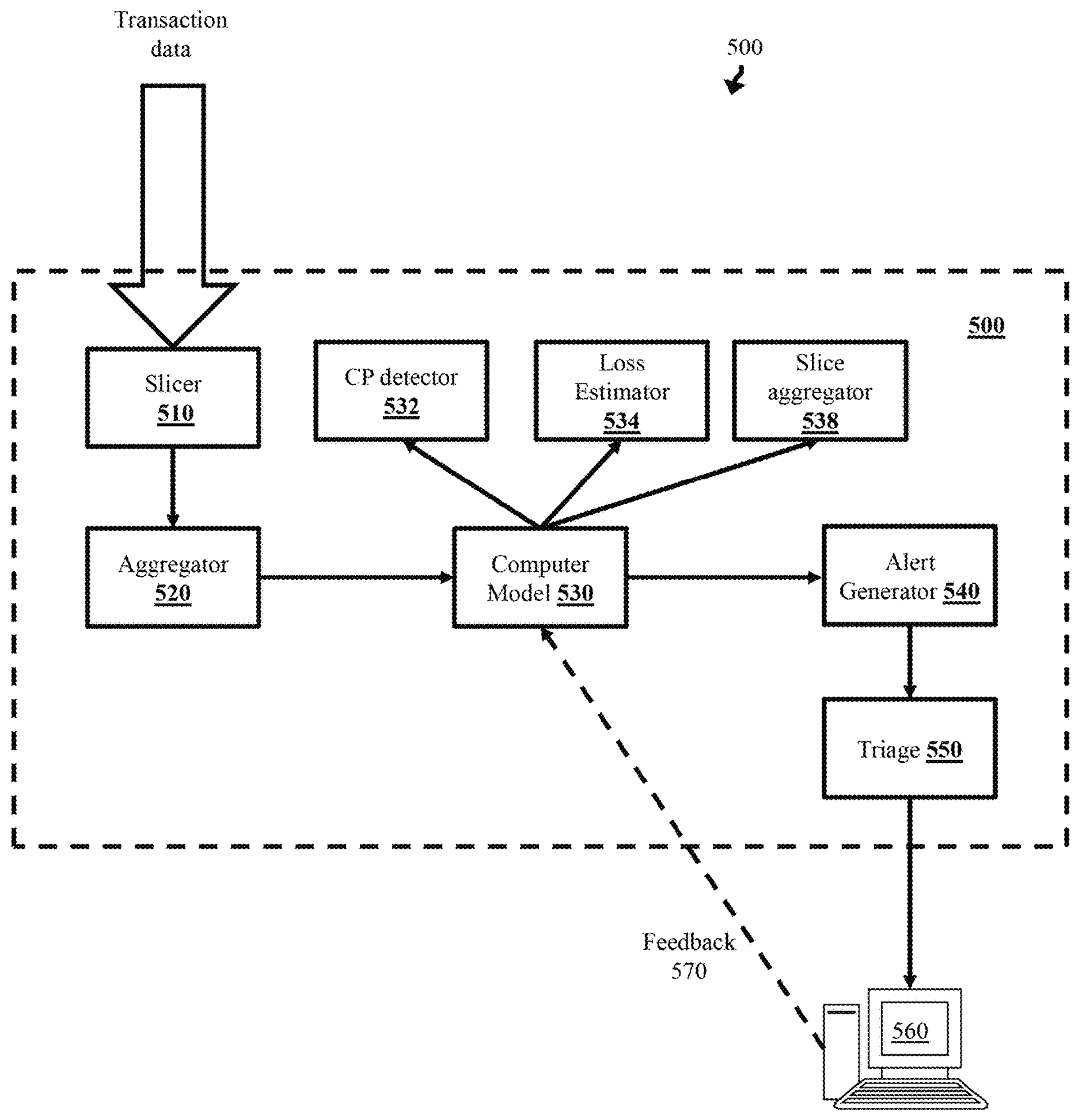
FIG. 5 illustrates a non-limiting example of the operation of the slice monitoring system, according to an embodiment.

A non-limiting example, as depicted in FIG. 5, illustrates how data can be analyzed using the methods discussed herein. In the depicted non-limiting example, an analytics server 500 may use various modules to analyze the data. The analytics server (via a data slicer 510) may receive transaction data (aggregated data associated with an electronic payment system) from one or more data sources associated with the electronic payment system and may generate various data slices. For instance, the data slicer 510 may disaggregate data in accordance with their respective attributes. Then the data within each data slice may be aggregated using the aggregator 520. For instance, the data may be organized in accordance with their respective timestamp. Ordering the data chronologically may allow the analytics server to impute an anomaly for some transactions. For instance, if an anomaly has occurred for a transaction, then it may be assumed that subsequent transactions are also affected by the anomaly.

The analytics server 500 may then execute the computer model 530. The computer model 530 may use the slice aggregator 538 to dynamically generate slices and aggregate smaller slices into bigger data slices that could produce meaningful alerts. With each iteration, the computer model 530 may evaluate the data slices and/or aggregation of multiple data slices. For instance, the computer model 530 may analyze different slices by using the CP detector 532 to identify one or more change points (to identify when the authorization point has dropped) and a loss estimator 534 to evaluate the importance of an alert. The analysis may be performed periodically (e.g., every hour) and various variables needed to detect an anomaly (e.g., baseline values) may be stored in a database (not shown in FIG. 5). Using the data generated as a result of the previous analysis, the analytics server 500 may detect how data trends are changing.

When analytics server 500 identifies an anomaly, the analytics server 500 uses the alert generator 540 to generate an alert and determine whether the alert is a true positive or a false positive.

If the alert if a true positive, the triage 550 may then identify higher-level anomalies within the series of anomalies. The triage 550 may apply a set of rules to score different anomalies and determine which alerts are more important. For instance, an anomaly in North America may be identified as more important than an anomaly localized to New Mexico. The analytics server 500 may then transmit the alert (along with an indication of the data slice or pertinent transaction data indicating the detected anomaly) to a user (and administrator) operating the user device 560. The user may review the alert and determine if the alert is a false positive alert. The data reviewed may then be fed back into the computer model and used for training process (feedback 570). For instance, the computer model can be re-calibrated in order to reduce the likelihood of false positive results. For instance, the computer model may recalibrate how it chooses to group the data slices. The recalibration may include revising one or more variables used by the computer model to group the data slices. For instance, when a false positive anomaly is indicated, the computer model may determine a list of data slices were identified and how they were combined. The computer model may then revise itself and its logic accordingly. The recalibration may also depend on characteristics of the anomaly detected.

Using the data generated and identified using the method 200, the analytics server may then train one or more separate computer models to predict the results discussed herein. For instance, the computer model may dynamically predict a group of data slices to be analyzed, such that the data is efficiently analyzed. The computer model may also predict an appropriate threshold to be used to determine whether the data slice (or group of data slices) indicate normal or anomalous behavior.

Figure 6:
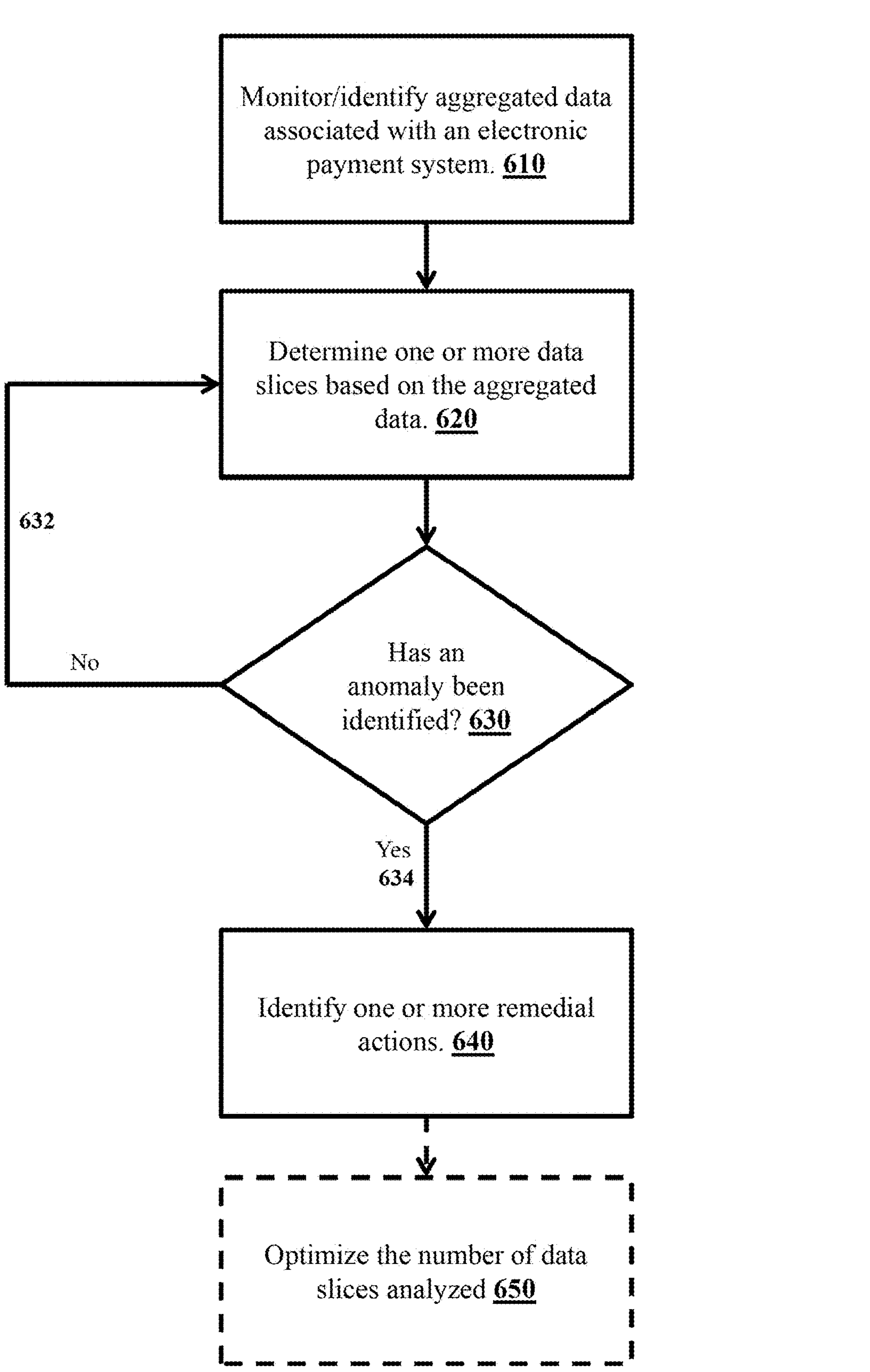
FIG. 6 illustrates a flow diagram of the operation of the slice monitoring system, according to an embodiment.

FIG. 6 illustrates a flow diagram of a process executed in an intelligent data slice monitoring system, according to an embodiment. The method 600 includes steps 610-650. However, other embodiments may include additional or alternative execution steps, or may omit one or more steps altogether. The method 600 is described as being executed by a server, similar to the analytics server described in FIG. 1. However, one or more steps of method 600 may also be executed by any number of computing devices operating in the distributed computing system described in FIG. 1.

At step 610, the analytics server may monitor and identify aggregated data associated with an electronic payment system. As discussed herein, the analytics server may periodically retrieve data associated with an electronic payment system. The data retrieved may be aggregated (and sometimes raw) data collected by various electronic components, entities, and servers/processors associated with the electronic payment system. The aggregated data may indicate the data associated with a set of transactions conducted (or otherwise facilitated) by the electronic payment system.

At step 620, the analytics server may determine one or more data slices based on the aggregated data (retrieved in the step 620). Using the methods discussed herein, the analytics server may disaggregate the data into distinct data slices. In one embodiment, the data may be disaggregated into data slices based on a list of transaction attributes (e.g., card-present or not present, CVC-transmitted or not transmitted, an attribute of the merchant, and the like). As discussed herein, data slices may be as granular as needed. For instance, a data slice may include transactions (and their corresponding data) associated with transactions narrowed based on more than one attribute.

The analytics server may group the data slices together using a computer model that has been trained in accordance with historical anomaly data. The computer model may identify a series of data slices to be analyzed together. For instance, the computer model may determine to combine a first data slice (indicating data associated with Mexican transactions in which CVC number was not required) and a second data slice (indicating data associated with card-not-present Mexican transactions) to determine if there is an anomaly within the electronic payment system.

At step 630, the analytics server may analyze the aggregated data in conjunction with the data slices to determine whether an anomaly exists. For instance, the analytics server may execute a BOCPD protocol to identify an anomaly within the data slices. If an anomaly is identified (the "yes" route 634), the analytics server may move to the step 640. If no anomaly is identified (the "no" route 632), the analytics server may move back to the step 620 and determine another data slice to analyze. For instance, the analytics server may determine that a server in charge of facilitating transactions in Mexico is not functioning properly. That is, the combination of data slices discussed herein may include data that is consistent with anomalous behavior.

At step 640, the analytics server may identify one or more remedial actions for the anomaly detected in the step 630. The analytics server may execute a lookup table to determine an appropriate remedial action. The lookup data table may include a list of anomalous behaviors and their corresponding root cause and/or appropriate action (to be taken) based on historical anomalies, their root causes, and their corresponding remedial actions.

The analytics server may then transmit an alert to one or more computing devices (e.g., system administrators) indicating the identified anomalous behavior (and its root case) and a recommended course of action including the identified remedial action.

At step 650, the analytics server may optionally optimize the number of data slices analyzed. Using the methods discussed herein, the analytics server may combine the one or more data slices analyzed to identify the anomaly with one or more additional data slices. The analytics server may then iteratively analyze the combination and determine if the anomaly can still be detected. Using these iterations, the analytics server may determine that a subsequent analysis can be performed with more/fewer number of data slices, thereby improving the process.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method for data anomaly detection comprising:

identifying, by a server, aggregated data comprising data corresponding to a set of attributes for a set of transactions, each attribute having one or more corresponding values;

generating, by the server, a set of data slices from the aggregated data, the set of data slices including a first data slice containing data corresponding to a first value of a plurality of values associated with a first attribute of the set of attributes;

iteratively executing, by the server, a computer model, having a hierarchical data structure comprising the set of data slices, that receives an input of the aggregated data and an input of at least the first data slice and outputs an identification of an anomaly associated with the aggregated data, wherein each data slice is defined by at least an attribute and an associated value, and wherein the server determines whether to add an additional data slice from the set of data slices to the first data slice to generate a revised first data slice based on determining whether the anomaly is detectable in the first data slice;

in response to determining that the anomaly is detectable in the first data slice, selecting, by the server based on iteratively analyzing the first data slice with a neighboring slice within the hierarchical data structure, the additional data slice, wherein the additional data slice shares a common attribute with the first data slice and differs from the first data slice by at least one value of the common attribute; and revising, by the server, the first data slice by adding the additional data slice.

2. The method of claim 1, further comprising:

receiving, by the server, an indication that a notification corresponds to a false positive anomaly; and recalibrating, by the server, the computer model to revise at least one variable used by the computer model in accordance with an attribute of the false positive anomaly.

3. The method of claim 1, wherein the set of data slices includes a second data slice corresponding to a second value for a second attribute, and wherein based on determining that a percentage of anomalous activity associated with one or more data records corresponding to the second data slice is above a threshold percentage, combining, by the server, the second data slice with a third data slice of the set of data slices.

4. The method of claim 3, further comprising:

training, by the server, a second computer model to identify a number of data slices that indicate the anomaly.

5. The method of claim 1, further comprising:

determining, by the server, to generate the first data slice associated with the first attribute based on identifying that the first attribute corresponds to at least one or more characteristics of a merchant.

6. The method of claim 1, further comprising:

determining, by the server based on the identification of the anomaly, a remediation action corresponding to the identified anomaly.

7. The method of claim 1, wherein the server determines the anomaly in accordance with an attribute of the input of the aggregated data and the input of at least the first data slice satisfying an anomaly threshold, the method further comprising predicting, by the server, the anomaly threshold.

8. The method of claim 7, wherein the anomaly threshold corresponds to the attribute of the first data slice.

9. The method of claim 1, further comprising:

in response to determining that the anomaly is not detectable in the revised first data slice, traversing back to the first data slice.

10. A system comprising:

a non-transitory storage medium comprising a set of instructions that when executed, cause a processor to:

identify aggregated data comprising data corresponding to a set of attributes for a set of transactions, each attribute having one or more corresponding values;

generate a set of data slices from the aggregated data, the set of data slices including a first data slice containing data corresponding to a first value of a plurality of values associated with a first attribute of the set of attributes;

iteratively execute a computer model, having a hierarchical data structure comprising the set of data slices, that receives an input of the aggregated data and an input of at least the first data slice and outputs an identification of an anomaly associated with the aggregated data, wherein each data slice is defined by at least an attribute and an associated value, and wherein the processor determines whether to add an additional data slice from the set of data slices to the first data slice to generate a revised first data slice based on determining whether the anomaly is detectable in the first data slice;

in response to determining that the anomaly is detectable in the first data slice, select, based on iteratively analyzing the first data slice with a neighboring slice within the hierarchical data structure, the additional data slice, wherein the additional data slice shares a common attribute with the first data slice and differs from the first data slice by at least one value of the common attribute; and revise the first data slice by adding the additional data slice.

11. The system of claim 10, wherein the set of instructions further cause the processor to:

receive an indication that a notification corresponds to a false positive anomaly; and recalibrate the computer model to revise at least one variable used by the computer model in accordance with an attribute of the false positive anomaly.

12. The system of claim 10, wherein the set of data slices includes a second data slice corresponding to a second value for a second attribute, and wherein based on determining that a percentage of anomalous activity associated with one or more data records corresponding to the second data slice is above a threshold percentage, the set of instructions cause the processor to combine the second data slice with a third data slice of the set of data slices.

13. The system of claim 12, wherein the set of instructions further cause the processor to:

train a second computer model to identify a number of data slices that indicate the anomaly.

14. The system of claim 10, wherein the set of instructions further cause the processor to:

determine to generate the first data slice associated with the first attribute based on identifying that the first attribute corresponds to at one or more characteristics of a merchant.

15. The system of claim 10, wherein the set of instructions further cause the processor to:

determine, based on the identification of the anomaly, a remediation action corresponding to the identified anomaly.

16. The system of claim 10, wherein the set of instructions cause the processor to determine the anomaly in accordance with an attribute of the input of the aggregated data and the input of at least the first data slice satisfying an anomaly threshold, wherein the instructions further cause the processor to predict the anomaly threshold.

17. The system of claim 16, wherein the anomaly threshold corresponds to the attribute of the first data slice.

18. The system of claim 10, wherein the set of instructions further cause the processor to:

in response to determining that the anomaly is not detectable in the revised first data slice, traverse back to the first data slice.

19. A system comprising:

a memory; and a processor configured to execute instructions stored in the memory to:

identify aggregated data comprising data corresponding to a set of attributes for a set of transactions, each attribute having one or more corresponding values;

generate a set of data slices from the aggregated data, the set of data slices including a first data slice containing data corresponding to a first value of a plurality of values associated with a first attribute of the set of attributes;

iteratively execute a computer model, having a hierarchical data structure comprising the set of data slices, that receives an input of the aggregated data and an input of at least the first data slice and outputs an identification of an anomaly associated with the aggregated data, wherein each data slice is defined by at least an attribute and an associated value, and wherein the processor determines whether to add an additional data slice from the set of data slices to the first data slice to generate a revised first data slice based on determining whether the anomaly is detectable in the first data slice;

in response to determining that the anomaly is detectable in the first data slice, select, based on iteratively analyzing the first data slice with a neighboring slice within the hierarchical data structure, the additional data slice, wherein the additional data slice shares a common attribute with the first data slice and differs from the first data slice by at least one value of the common attribute; and revise the first data slice by adding the additional data slice.

20. The system of claim 19, wherein the processor is further configured to:

receive an indication that a notification corresponds to a false positive anomaly; and recalibrate the computer model to revise at least one variable used by the computer model in accordance with an attribute of the false positive anomaly.

* * * * *